(12) United States Patent
Nakamura et al.

(10) Patent No.: US 8,265,485 B2
(45) Date of Patent: Sep. 11, 2012

(54) OPTICAL TRANSMISSION SYSTEM AND METHOD FOR CHROMATIC DISPERSION COMPENSATION

(75) Inventors: Kantaro Nakamura, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 625 days.

(21) Appl. No.: 12/405,582

(22) Filed: Mar. 17, 2009

(65) Prior Publication Data

US 2009/0238571 A1 Sep. 24, 2009

(30) Foreign Application Priority Data

Mar. 21, 2008 (JP) .................................. 2008-074253

(51) Int. Cl.
*H04J 14/02* (2006.01)
(52) U.S. Cl. ............ 398/97; 398/11; 398/119; 398/177; 398/180
(58) Field of Classification Search ..................... 398/11, 398/97, 173, 177, 180
See application file for complete search history.

(56) References Cited

U.S. PATENT DOCUMENTS

| 6,229,631 | B1 | 5/2001 | Sate et al. |
| 2005/0041975 | A1 | 2/2005 | Nakamura et al. |
| 2005/0226628 | A1 * | 10/2005 | Watanabe ..................... 398/147 |
| 2005/0226629 | A1 | 10/2005 | Ooi et al. |
| 2007/0140700 | A1 | 6/2007 | Vassilieva et al. |

FOREIGN PATENT DOCUMENTS

| JP | 11-8590 | 1/1999 |
| JP | 2005-065019 | 3/2005 |
| JP | 2005-295126 | 10/2005 |
| JP | 2007-174659 | 7/2007 |

OTHER PUBLICATIONS

K. Nakamura et al., "Dispersion Map Suitable for Hybrid 10 Gb/s NRZ and 40 Gb/s RZ-DQPSK Transmission over 50 GHz-Spaced Network with Low Dispersion Fibre" Sep. 16, 2007.
Japanese Office Action for corresponding Japanese Application 2008-074253; dated Apr. 10, 2012.

* cited by examiner

*Primary Examiner* — Dung Nguyen
(74) *Attorney, Agent, or Firm* — Staas & Halsey LLP

(57) ABSTRACT

An optical transmission system including an optical transmission path for transmitting WDM signals multiplexed different wavelength optical signals, the WDM signals including different bit rate optical signals or different modulation format optical signals; a repeater arranged in the optical transmission path, the repeater including a chromatic dispersion compensation unit for compensating chromatic dispersion compensation for the WDM signals; and a network management system including processes of determining a dispersion compensation ratio indicating the ratio with respect to the dispersion compensation amount at which the residual dispersion of the WDM signals are zero after transmission via the optical transmission path, on the bases of the mixture ratio of different optical signals included in the WDM signals, and variably setting the dispersion compensation amount for the in-line repeater according to the dispersion compensation ratio.

8 Claims, 18 Drawing Sheets

FIG. 6A
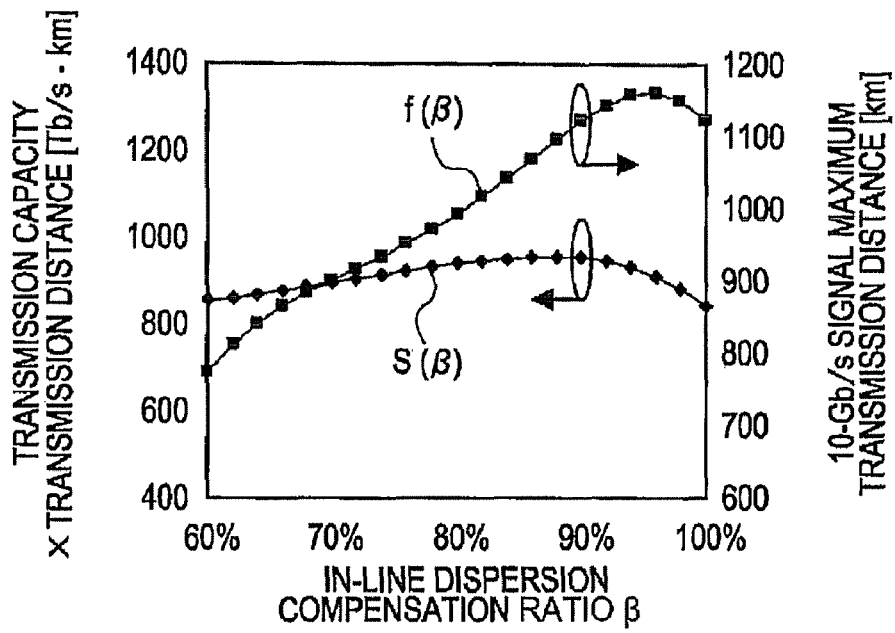
10-Gb/s SIGNAL MAXIMUM TRANSMISSION DISTANCE AND
PRODUCT OF TRANSMISSION CAPACITY AND TRANSMISSION DISTANCE
(60 CHANNELS FOR 10-Gb/s SIGNAL, 20 CHANNELS FOR 40-Gb/s SIGNAL)
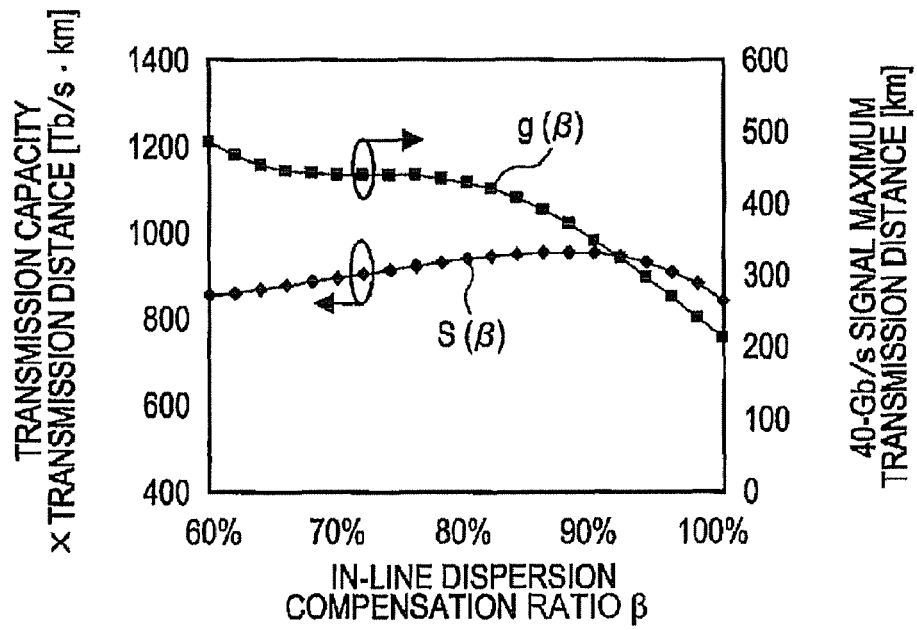
40-Gb/s SIGNAL MAXIMUM TRANSMISSION DISTANCE AND
PRODUCT OF TRANSMISSION CAPACITY AND TRANSMISSION DISTANCE
(60 CHANNELS FOR 10-Gb/s SIGNAL, 20 CHANNELS FOR 40-Gb/s SIGNAL)

FIG. 6B
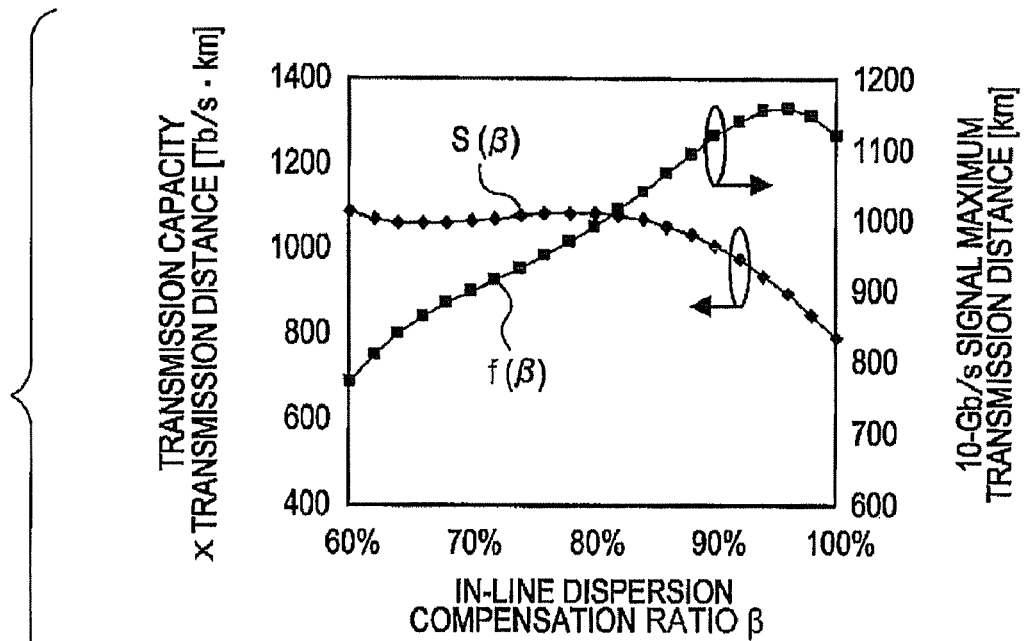
10-Gb/s SIGNAL MAXIMUM TRANSMISSION DISTANCE AND
PRODUCT OF TRANSMISSION CAPACITY AND TRANSMISSION DISTANCE
(40 CHANNELS FOR 10-Gb/s SIGNAL, 40 CHANNELS FOR 40-Gb/s SIGNAL)
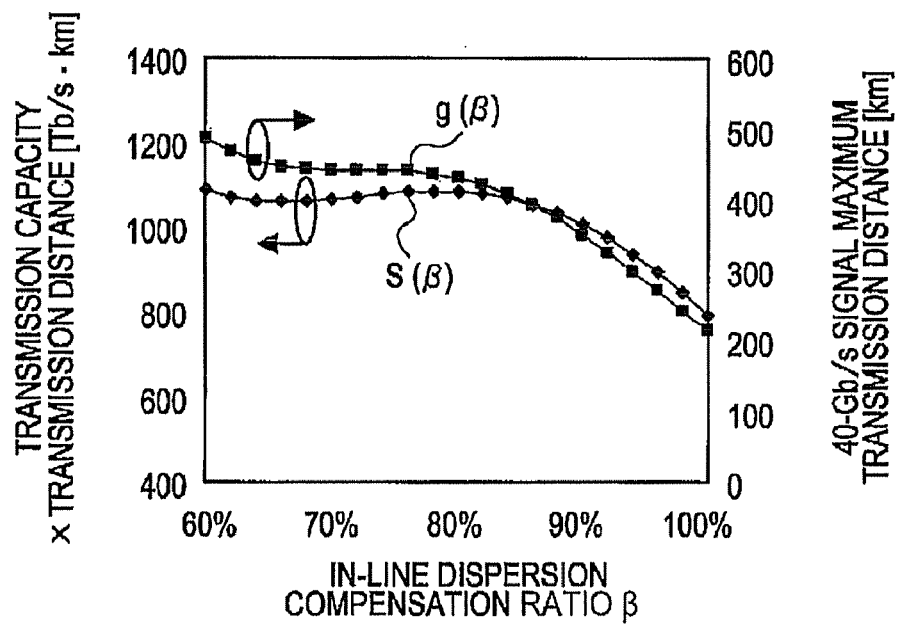
40-Gb/s SIGNAL MAXIMUM TRANSMISSION DISTANCE AND
PRODUCT OF TRANSMISSION CAPACITY AND TRANSMISSION DISTANCE
(40 CHANNELS FOR 10-Gb/s SIGNAL, 40 CHANNELS FOR 40-Gb/s SIGNAL)

FIG. 6C
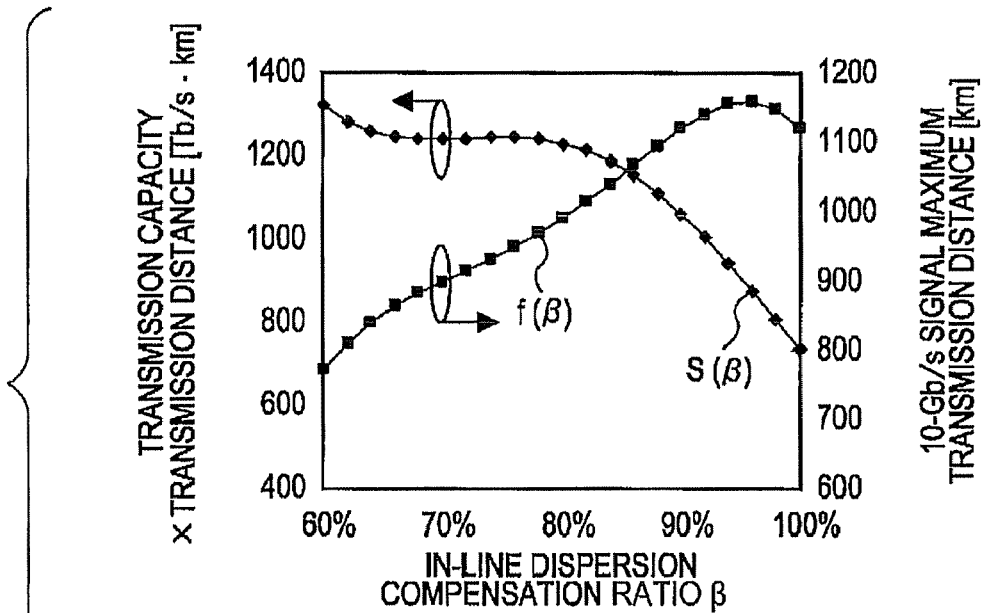
10-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 60 CHANNELS FOR 40-Gb/s SIGNAL)
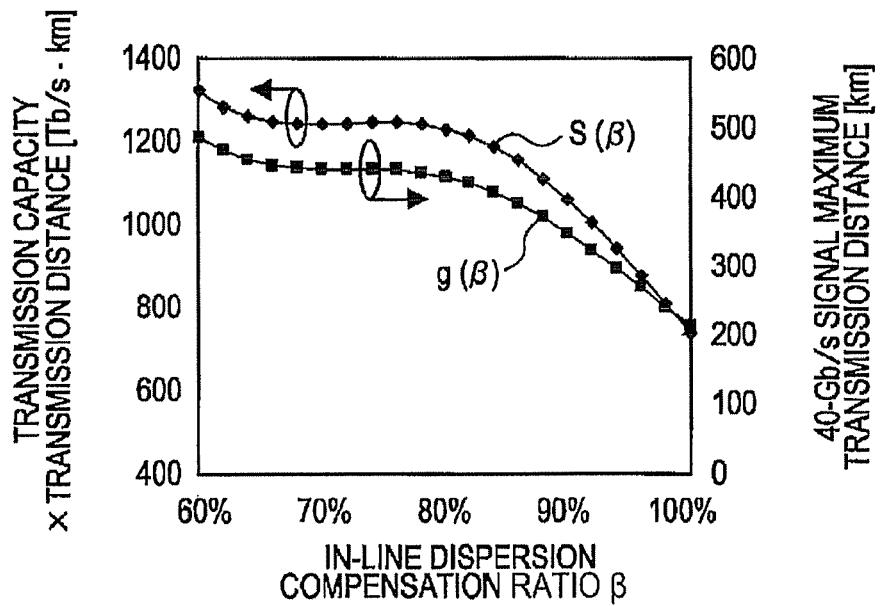
40-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 60 CHANNELS FOR 40-Gb/s SIGNAL)

FIG. 10A
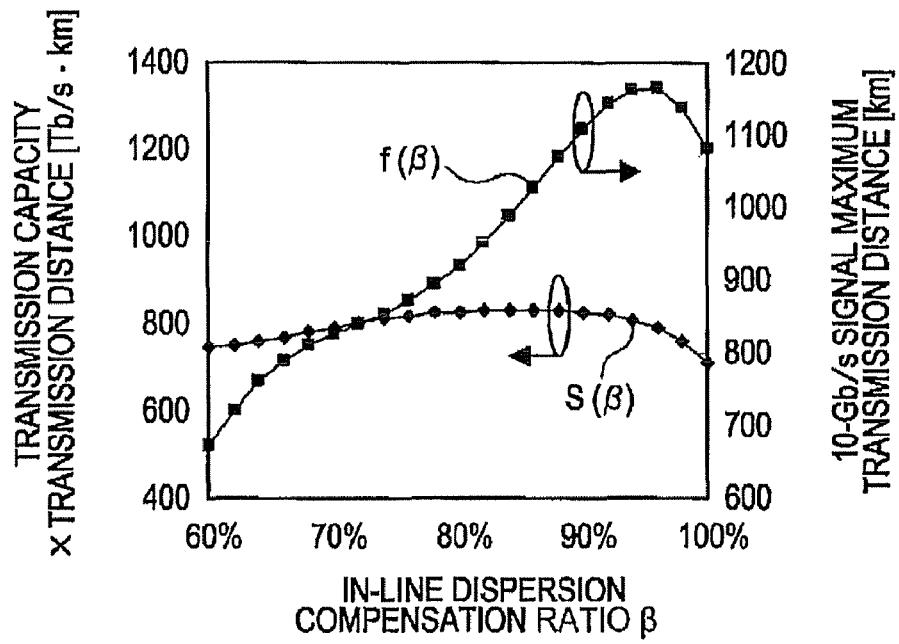
10-Gb/s SIGNAL MAXIMUM TRANSMISSION DISTANCE AND
PRODUCT OF TRANSMISSION CAPACITY AND TRANSMISSION DISTANCE
(60 CHANNELS FOR 10-Gb/s SIGNAL, 20 CHANNELS FOR 40-Gb/s SIGNAL)
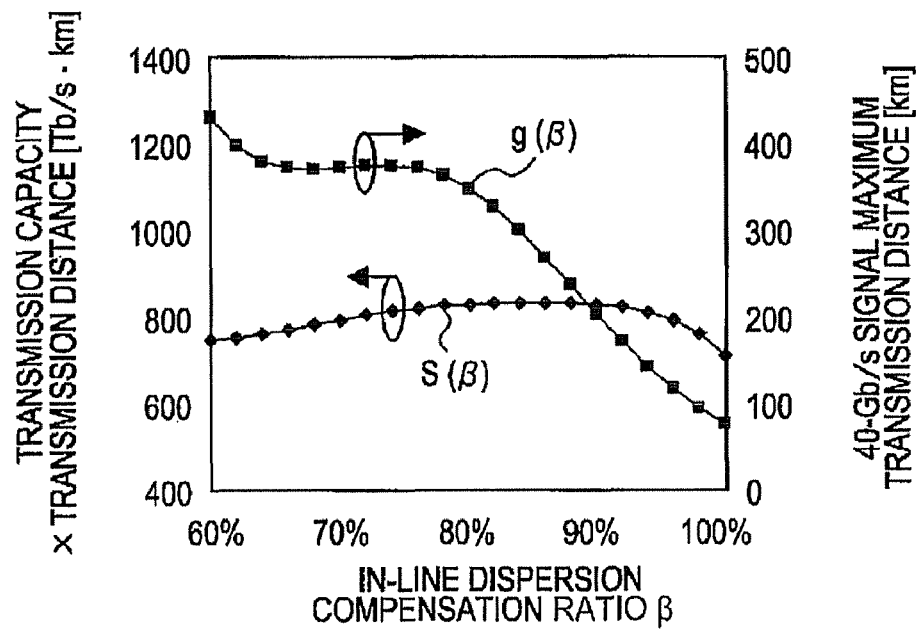
40-Gb/s SIGNAL MAXIMUM TRANSMISSION DISTANCE AND
PRODUCT OF TRANSMISSION CAPACITY AND TRANSMISSION DISTANCE
(60 CHANNELS FOR 10-Gb/s SIGNAL, 20 CHANNELS FOR 40-Gb/s SIGNAL)

FIG. 10B
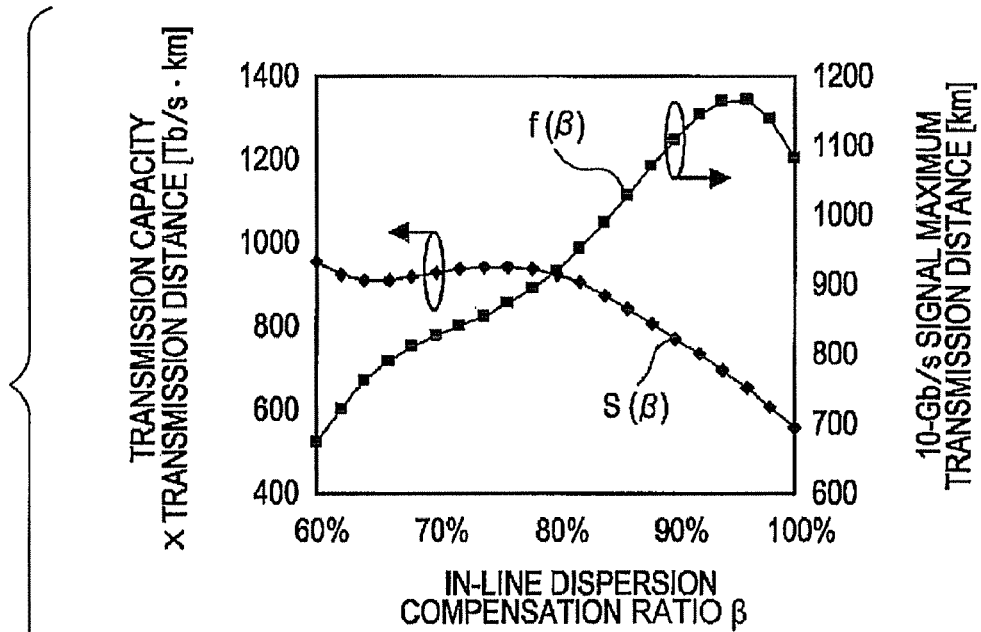
10-Gb/s SIGNAL MAXIMUM TRANSMISSION DISTANCE AND
PRODUCT OF TRANSMISSION CAPACITY AND TRANSMISSION DISTANCE
(40 CHANNELS FOR 10-Gb/s SIGNAL, 40 CHANNELS FOR 40-Gb/s SIGNAL)
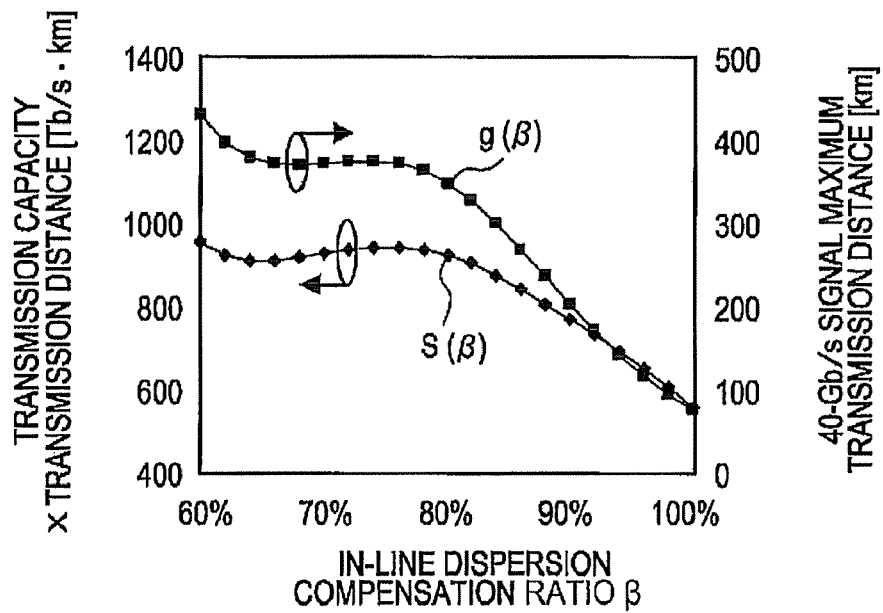
40-Gb/s SIGNAL MAXIMUM TRANSMISSION DISTANCE AND
PRODUCT OF TRANSMISSION CAPACITY AND TRANSMISSION DISTANCE
(40 CHANNELS FOR 10-Gb/s SIGNAL, 40 CHANNELS FOR 40-Gb/s SIGNAL)

FIG. 10C
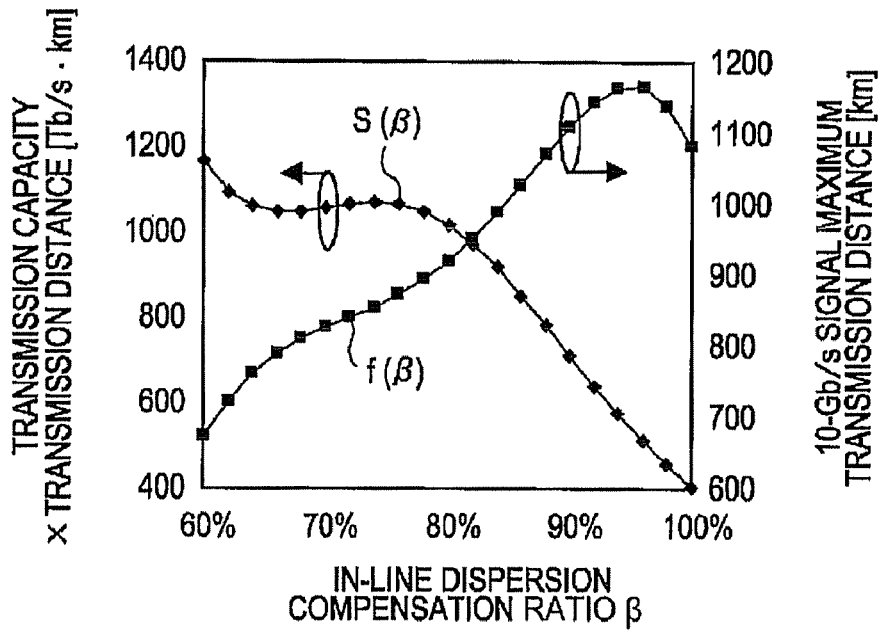
10-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 60 CHANNELS FOR 40-Gb/s SIGNAL)
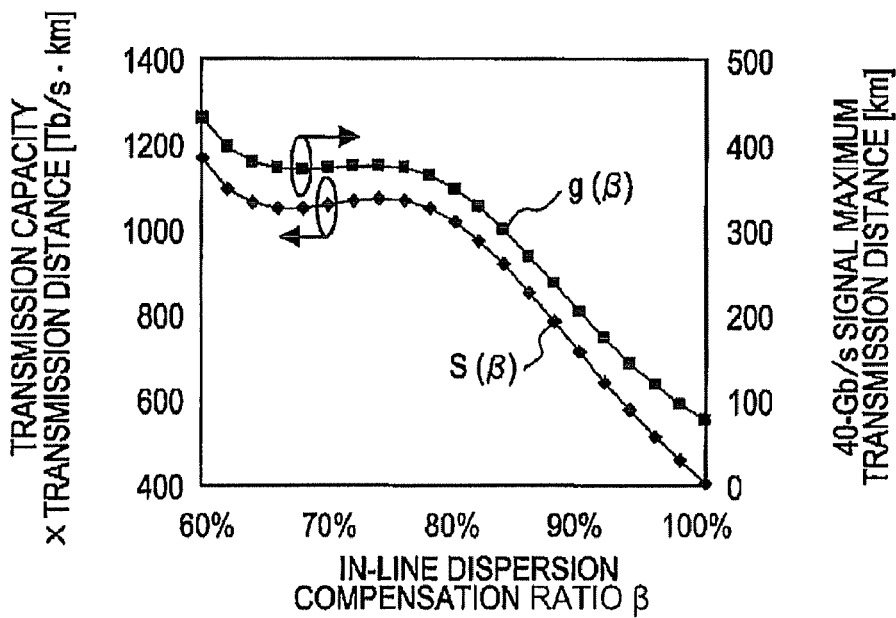
40-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 60 CHANNELS FOR 40-Gb/s SIGNAL)

FIG. 14A
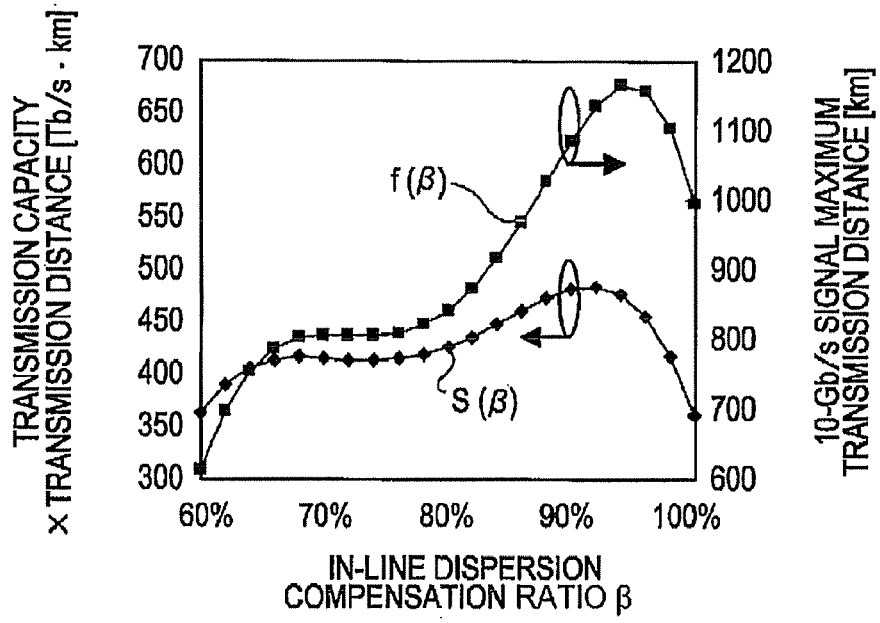
10-Gb/s SIGNAL MAXIMUM TRANSMISSION DISTANCE AND
PRODUCT OF TRANSMISSION CAPACITY AND TRANSMISSION DISTANCE
(30 CHANNELS FOR 10-Gb/s SIGNAL, 10 CHANNELS FOR 40-Gb/s SIGNAL)
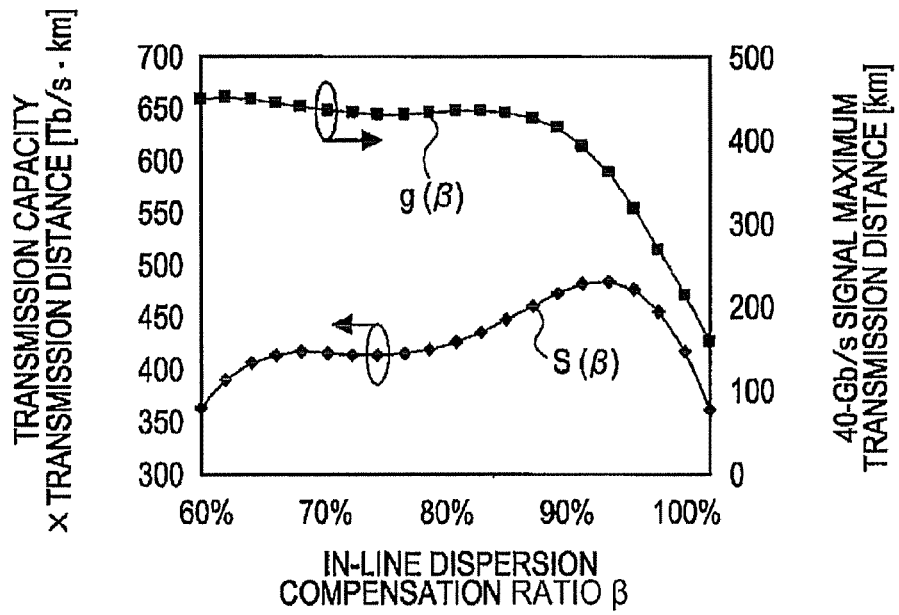
40-Gb/s SIGNAL MAXIMUM TRANSMISSION DISTANCE AND
PRODUCT OF TRANSMISSION CAPACITY AND TRANSMISSION DISTANCE
(30 CHANNELS FOR 10-Gb/s SIGNAL, 10 CHANNELS FOR 40-Gb/s SIGNAL)

FIG. 14B
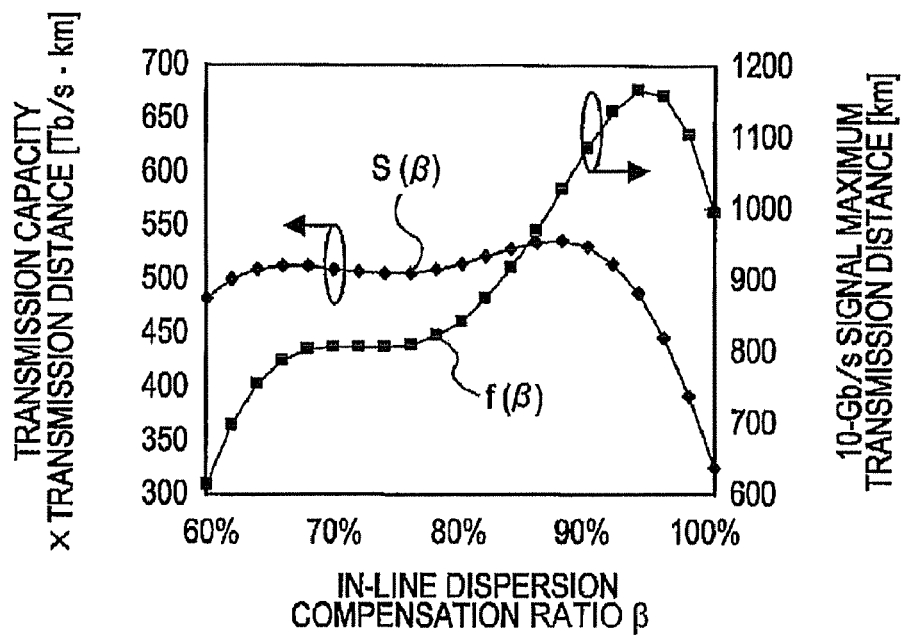
10-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 20 CHANNELS FOR 40-Gb/s SIGNAL)
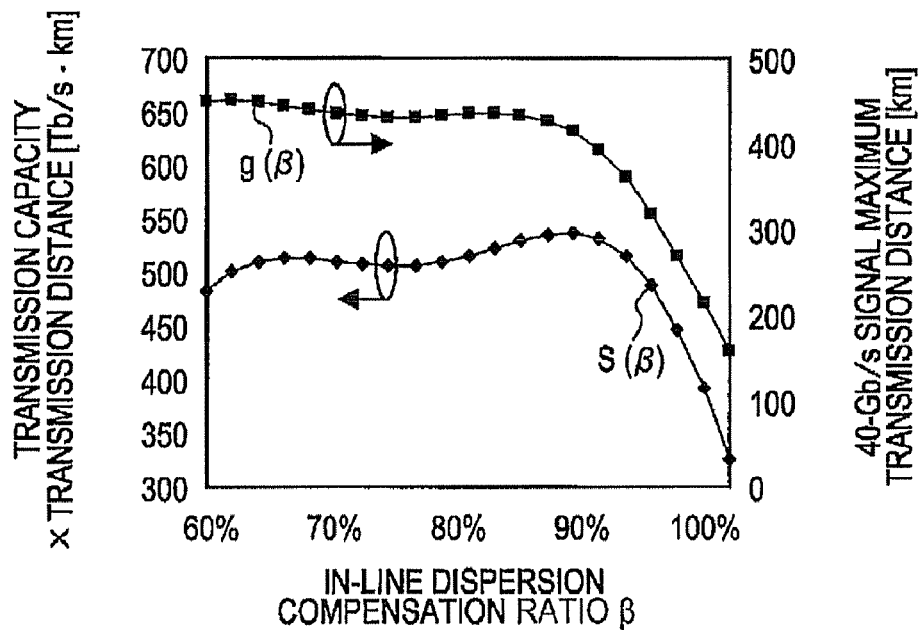
40-Gb/s SIGNAL MAXIMUM TRANSMISSION DISTANCE AND
PRODUCT OF TRANSMISSION CAPACITY AND TRANSMISSION DISTANCE
(20 CHANNELS FOR 10-Gb/s SIGNAL, 20 CHANNELS FOR 40-Gb/s SIGNAL)

FIG. 14C
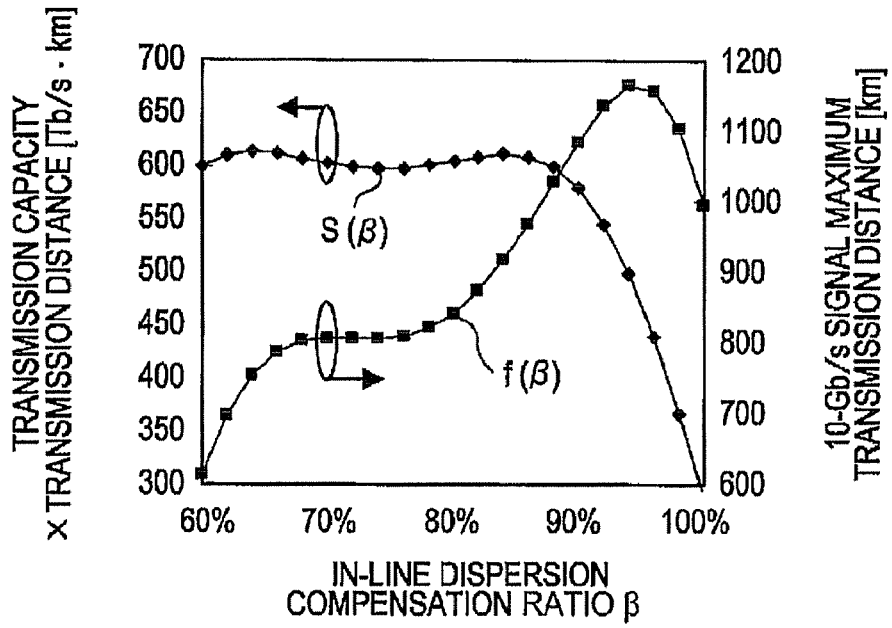
10-Gb/s SIGNAL MAXIMUM TRANSMISSION DISTANCE AND
PRODUCT OF TRANSMISSION CAPACITY AND TRANSMISSION DISTANCE
(10 CHANNELS FOR 10-Gb/s SIGNAL, 30 CHANNELS FOR 40-Gb/s SIGNAL)
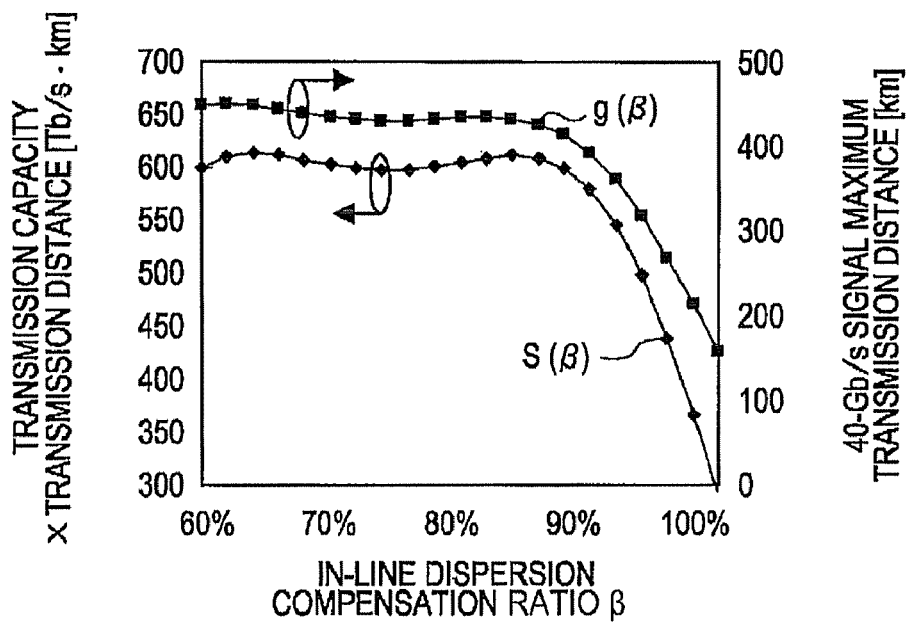
40-Gb/s SIGNAL MAXIMUM TRANSMISSION DISTANCE AND
PRODUCT OF TRANSMISSION CAPACITY AND TRANSMISSION DISTANCE
(10 CHANNELS FOR 10-Gb/s SIGNAL, 30 CHANNELS FOR 40-Gb/s SIGNAL)

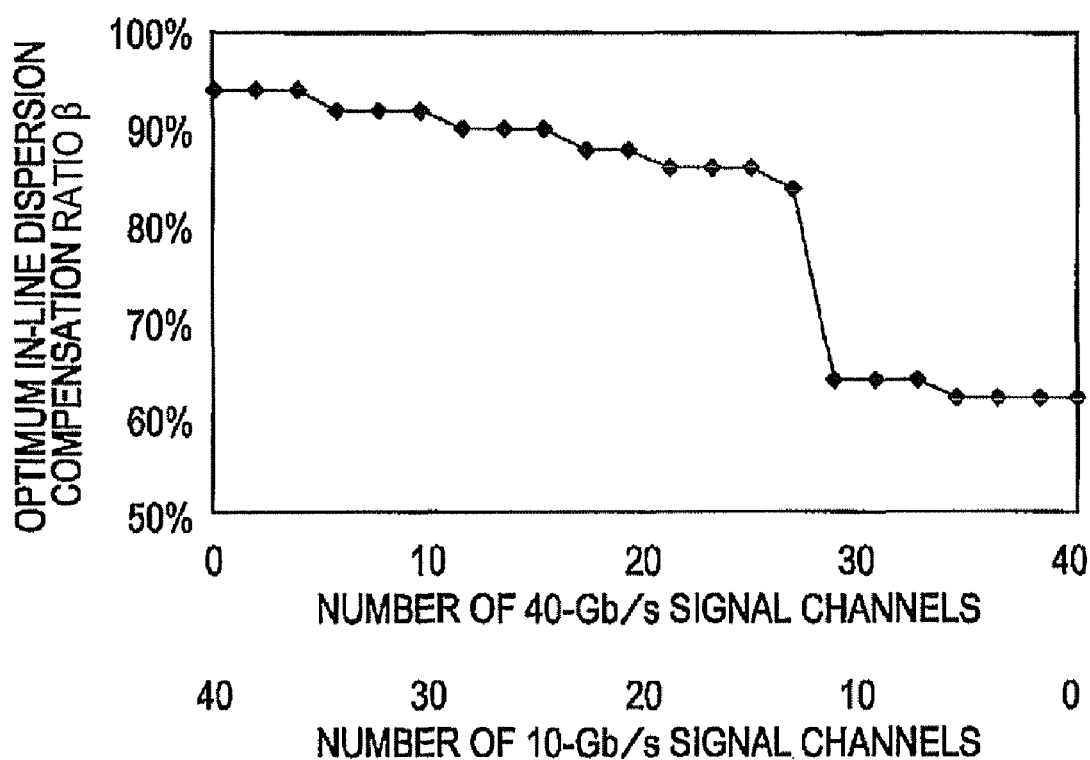

OPTICAL TRANSMISSION SYSTEM AND METHOD FOR CHROMATIC DISPERSION COMPENSATION

CROSS-REFERENCE TO RELATED APPLICATION

This application is based upon and claims the benefit of priority of the prior Japanese Patent Application No. 2008-74253, filed on Mar. 21, 2008, the entire contents of which are incorporated herein by reference.

FIELD

The present invention relates to a compensation technique for chromatic dispersion in an optical transmission system.

BACKGROUND

There is an increased demand with respect to the high capacity optical transmission systems in backbone optical transmission systems. Implementation of WDM (Wavelength Division Multiplexing) optical transmission system having a bit rate of 40 Gb/s has begun. As a technique for implementing such a 40-Gb/s WDM optical transmission system, a system newly constructed can be conceived in which all the channels have a bit rate of 40 Gb/s. However, such a system leads to high implementation costs. In order to solve such a problem, an implementation technique has been proposed in which a part of the channels included in an existing 10-Gb/s WDM optical transmission system is gradually replaced with the 40-Gb/s WDM channels. With such an arrangement, the WDM optical transmission system may provide a 10-Gb/s optical signal and a 40-Gb/s optical signal in a mixed manner.

WDM optical transmission system compensates chromatic dispersion that occurs in an optical transmission path. It is known that the optimum value for the dispersion compensation changes according to the bit rate of an optical signal and a modulation format. Accordingly, such an arrangement, in which optical signals that provide bit rates that differ from one another are handled in a mixed manner as described above, has a problem regarding how the suitable dispersion compensation is to be determined.

Relating to the aforementioned problem, dispersion compensation techniques have been proposed in Japanese Laid-open Patent Publication No. 2005-065019 and Japanese Laid-open Patent Publication No. 2005-295126. The systems disclosed in the Japanese Laid-open Patent Publication No. 2005-065019 and the Japanese Laid-open Patent Publication No. 2005-295126 are optical transmission systems including a compensation node for each predetermined span, in addition to a in-line repeater employing a dispersion compensation fiber (DCF) or the like. At the compensation node, the WDM signals are optically demultiplexed, and are subjected to dispersion compensation in increments of bit rates. Subsequently, optical multiplexing is performed, and the WDM signals thus optically multiplexed are transmitted to the optical transmission path.

In the WDM optical transmission systems disclosed in the aforementioned the Japanese Laid-open Patent Publication No. 2005-065019 and Japanese Laid-open Patent Publication No. 2005-295126, at a compensation node having a function as the optical add drop multiplexer (OADM) or a function as the optical cross connect (OXC), optical signals multiplexed in the form of WDM signals are separated in increments of bit rates, and dispersion compensation is performed for each optical signal. On the other hand, the dispersion compensation amount provided by the in-line repeater is set to a predetermined common value for all the bit rates, giving consideration to residual dispersion. That is to say, the in-line dispersion compensation amount set for the existing 10-Gb/s WDM signals are employed without change for the WDM signals including the 10-Gb/s signals and the 40-Gb/s signals in a mixed manner.

In a case in which the in-line dispersion compensation is adjusted for one of the optical signals having a particular bit rate as described above, the compensation error in the in-line repeater may be accumulated at each compensation node, leading to marked deterioration of the waveform. This leads to a problem of reduction in the WDM signal transmission distance. For example, in a case in which the transmission distance has been reduced, there is a detriment to increase the number of compensation nodes, which are expensive. That is to say, optimum in-line dispersion compensation for optical signals having a particular bit rate is not employed suitably for other optical signals having different bit rates. In some cases, such in-line dispersion compensation may reduce the performance of the WDM optical transmission system.

SUMMARY

According to an aspect of the invention, an optical transmission system including an optical transmission path for transmitting WDM signals multiplexed different wavelength optical signals, the WDM signals including different bit rate optical signals or different modulation format optical signals; a repeater arranged in the optical transmission path, the repeater including a chromatic dispersion compensation unit for compensating chromatic dispersion compensation for the WDM signals; and a network management system including processes of determining a dispersion compensation ratio indicating the ratio with respect to the dispersion compensation amount at which the residual dispersion of the WDM signals are zero after transmission via the optical transmission path, on the bases of the mixture ratio of different optical signals included in the WDM signals, and variably setting the dispersion compensation amount for the in-line repeater according to the dispersion compensation ratio.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 6A-6C are a first example of a graph which illustrates the relation between the dispersion compensation ratio, the transmission distance, and S(β), for each predetermined channel mixture ratio.

FIGS. 10A-10C are a second example of a graph which illustrates the relation between the dispersion compensation ratio, the transmission distance, and S(β), for each predetermined channel mixture ratio.

FIGS. 14A-14C is a third example of a graph which illustrates the relation between the dispersion compensation ratio, the transmission distance, and S(β), for each predetermined channel mixture ratio.

FIG. 15 is a third example of a graph which illustrates the relation between the channel mixture ratio and the dispersion compensation ratio at which S(β) exhibits the maximum value.

DESCRIPTION OF EMBODIMENT

Figure 1:
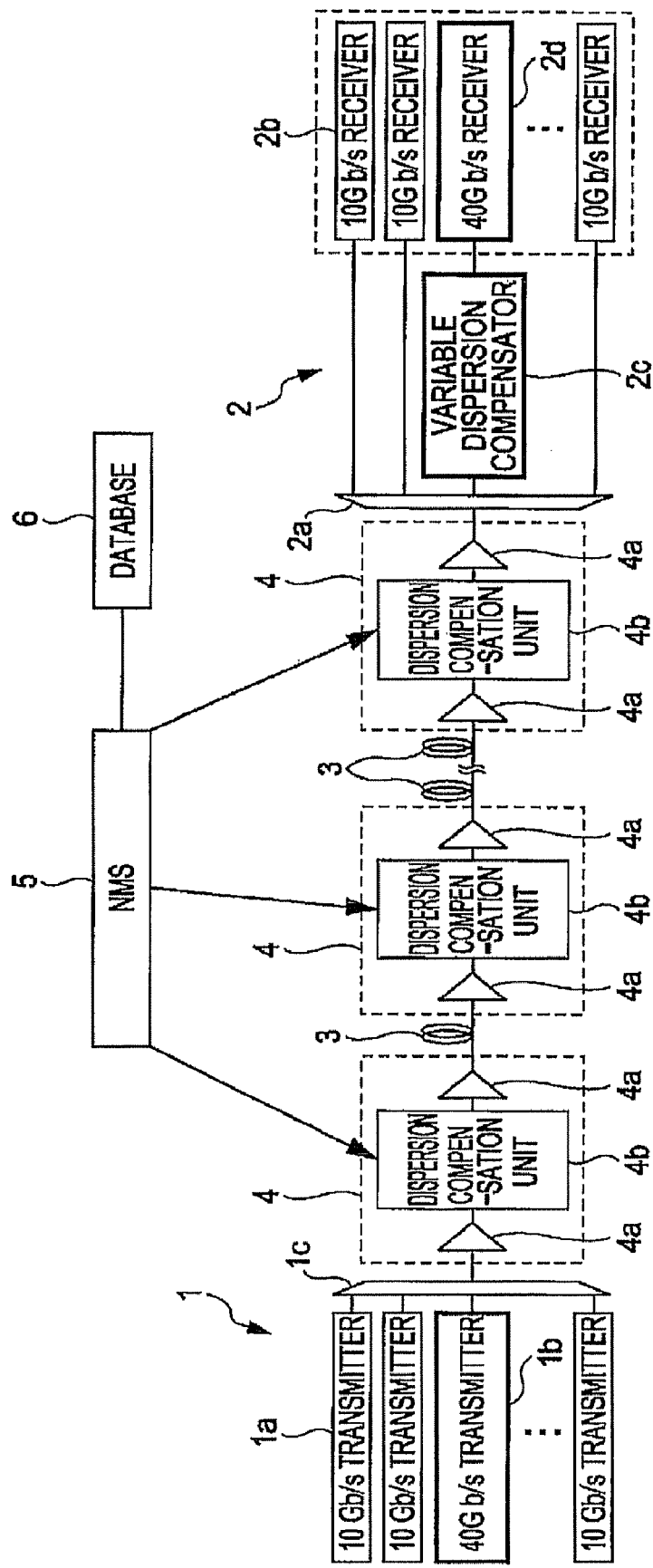
FIG. 1 is a block diagram which illustrates a point-to-point optical transmission system to which the present invention can be applied.

FIG. 1 is a block diagram which illustrates principal components of a WDM optical transmission system. In this example, the WDM optical transmission system is a point-to-point system which transmits, in a one-on-one manner, WDM signals obtained by performing wavelength division multiplexing on optical signals (which will be referred to as "10-Gb/s optical signals" hereafter) modulated using an NRZ (Non Return to Zero) modulation format at a bit rate of 10 Gb/s. Furthermore, the aforementioned WDM optical transmission system also handles, in a mixed manner, optical signals (which will be referred to as "40-Gb/s optical signals" hereafter) modulated using an RZ-DQPSK (Return to Zero Differential Quadrature Phase Shift Keying) modulation format at a bit rate of 40 Gb/s. That is to say, via the optical transmission path of the aforementioned system, WDM signals, which has been obtained by performing the wavelength division multiplexing on the optical signals having bit rates that differ from one another, or modulated using modulation formats that differ from one another, is transmitted.

As an example, description will be made regarding an arrangement which handles the optical signals modulated using a 10-Gb/s NRZ method and the optical signals modulated in a 40-Gb/s RZ-DQPSK method in a mixed manner. However, the bit rates and the modulation formats which can be employed in the present invention are not restricted to such an arrangement.

A transmitting terminal 1 includes one or more transmitters 1a which generate 10-Gb/s optical signals, and one or more transmitters 1b which generate 40-Gb/s optical signals. With such an arrangement, the optical signals, each of which has a corresponding wavelength (channel) and which are output from the transmitters 1a and 1b, are subjected to wavelength division multiplexing by an optical multiplexer 1c, and the WDM signals are transmitted to the optical transmission path.

At a receiving terminal 2, the WDM signals transmitted via the optical transmission path is input to an optical demultiplexer 2a, and separated in increments of wavelengths (channels). After the separation, the 10-Gb/s optical signals are input to a 10-Gb/s receiver 2b, and are demodulated. On the other hand, after the separation, the 40-Gb/s optical signals are input to a 40-Gb/s receiver 2d via a variable dispersion compensator 2c, and demodulated.

The optical transmission path, via which the WDM signals are transmitted between the transmitting terminal 1 and the receiving terminal 2, has a configuration including transmission path fibers 3. Furthermore, in-line repeaters 4 are disposed in increments of predetermined repeating sections (spans). The in-line repeater 4 has a configuration in which a dispersion compensation unit 4b is disposed between two optical amplifiers 4a. The dispersion compensation unit 4b allows the dispersion compensation ratio to be variably set. A network management system (NMS) 5 selects the dispersion compensation ratio for the in-line repeater 4 from the values stored in a database 6, and sets the value thus selected.

Figure 2:
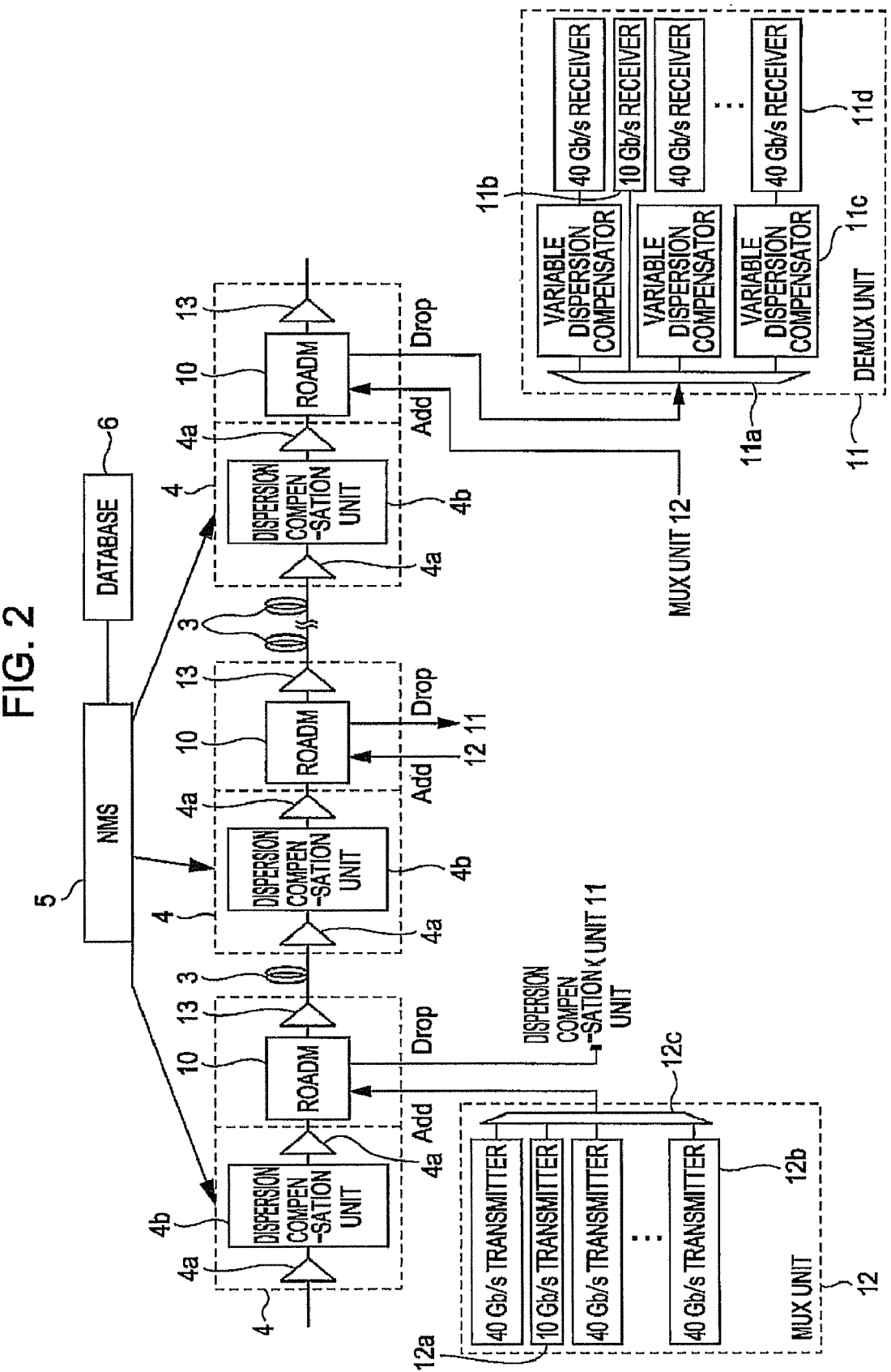
FIG. 2 is a block diagram which illustrates an ROADM optical transmission system to which the present invention can be applied.

FIG. 2 illustrates an example of the WDM optical transmission system including OADM nodes. This system also has a configuration including the transmission path fibers 3 and the in-line repeaters 4 provided in increments of predetermined repeating sections. With such an arrangement, the network management system (NMS) 5 selects the dispersion compensation ratio for the in-line repeater 4b from the values stored in the database 6, and sets the value thus selected.

The function of the OADM is executed by ROADM (Reconfigurable Optical Add/Drop Multiplexer) apparatuses 10 each of which is disposed downstream of the in-line repeater 4 at each span. The ROADM apparatus 10 transmits a drop optical signal, which has been obtained by optically demultiplexing the WDM signals transmitted to a DEMUX unit 11. Furthermore, the ROADM apparatus 10 performs optical-multiplexing on the add optical signal and the through optical signal, which have been transmitted from the MUX unit 12, and outputs the optical signal thus optically multiplexed to the optical amplifier 13. The optical amplifier 13 amplifies the through optical signal and the add optical signal output from the ROADM apparatus 10 together, and transmits the optical signal thus amplified to the transmission path fiber 3.

In the DEMUX unit 11, the drop optical signal thus optically demultiplexed by the ROADM apparatus 10 is input to an optical demultiplexer 11a, and is demultiplexed to each wavelength. The 10-Gb/s optical signals thus demultiplexed are input to a 10-Gb/s receiver 11b, and are demodulated. On the other hand, the 40-Gb/s optical signals thus demultiplexed are input to a 40-Gb/s receiver 11d via a variable dispersion compensator 11c, and are demodulated.

The MUX unit 12 includes one or more transmitters 12a which generate 10-Gb/s optical signals, and one or more transmitters 12b which generate 40-Gb/s optical signals. With such an arrangement, the optical signals having respective wavelengths output from these transmitters 12a and 12b are subjected to wavelength division multiplexing by an optical multiplexer 12c, and the optical signal thus optically multiplexed is output to the ROADM apparatus 10 as the add optical signal of the WDM signals.

As described above, in a case in which the dispersion compensation technique proposed in the present invention is applied to a WDM optical transmission system having the OADM function, such an arrangement allows the dispersion compensation ratio for the in-line repeater 4 to be dynamically changed and to be variably set according to change in the bit rate or change in the modulation format in the WDM signals. That is to say, even in a case in which the system configuration is dynamically changed by switching the optical signals to be handled as the add/drop signals by the ROADM apparatus 10, such an arrangement allows the in-line dispersion compensation ratio to be dynamically changed according to the change in the system configuration. Thus, such an arrangement maintains the optimum system performance.

Figure 3A:
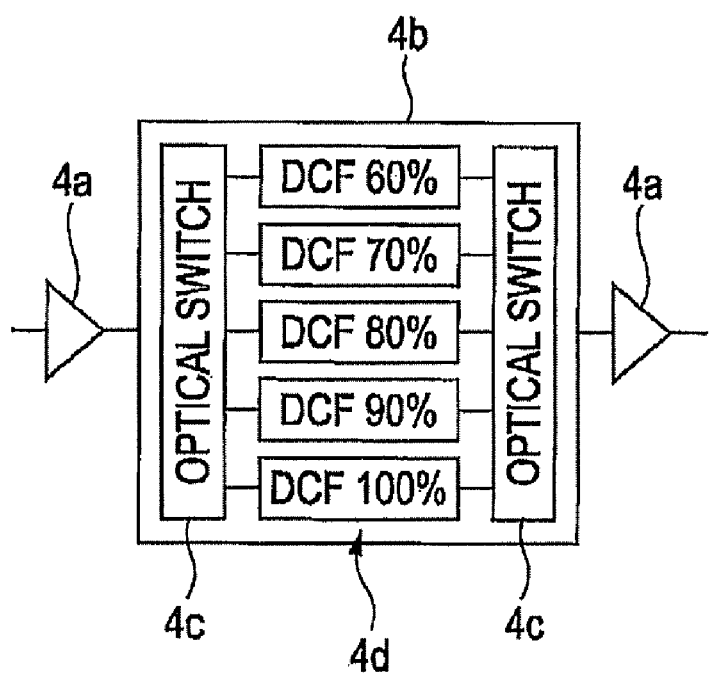
FIGS. 3A-3C are a block diagram which illustrates a configuration example of an in-line repeater.
Figure 3B:
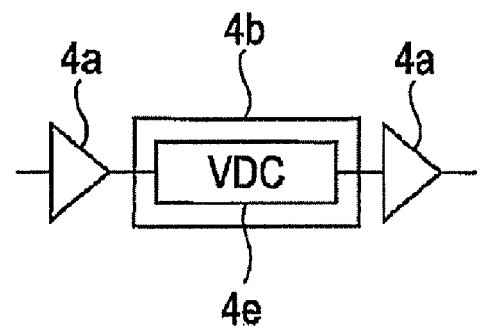
Figure 3C:
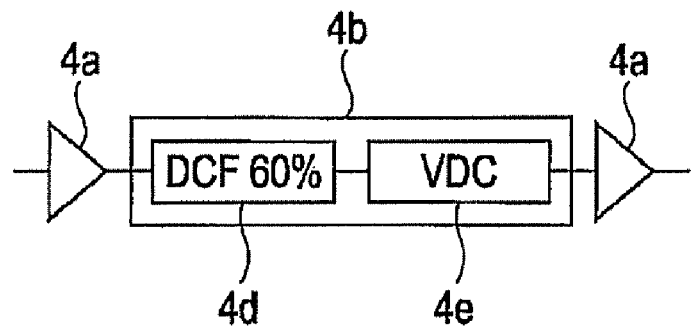

FIGS. 3A-3C illustrate a configuration example of the in-line repeater 4. The in-line repeater 4 described in the present embodiment is configured such that it is capable of variably setting the dispersion compensation ratio which indicates the ratio with respect to the dispersion compensation amount at which the residual dispersion of the WDM signals are zero after transmission via the optical path. That is to say, when the dispersion compensation ratio is set to 100%, the dispersion compensation amount thus obtained reduces the residual dispersion to zero.

The dispersion compensation unit 4b included in the in-line repeater 4 illustrated in FIG. 3A has a configuration in which multiple dispersion fibers 4d having dispersion compensation ratios that differ from one another are connected in parallel between two optical switches 4c. With such an arrangement illustrated in the drawing, a total of five dispersion compensation fibers 4d are connected in parallel with the dispersion compensation ratios over a range of 60% to 100% at 10% intervals. The dispersion compensation ratio is variably set by switching the dispersion compensation fibers 4d according to a signal from the network management system 5.

The dispersion compensation unit 4b included in the in-line repeater 4 illustrated in FIG. 3B is an example employing a known variable dispersion compensator (VDC) 4e using VIPA (Virtually Imaged Phase Array) or the like.

The dispersion compensation unit 4b included in the in-line repeater 4 illustrated in FIG. 3C is an example having a configuration in which the dispersion compensation fiber 4d having a dispersion compensation ratio of 60% and the variable dispersion compensator 4e as illustrated in FIG. 3B are connected in series. As described above, by making a combination of the fixed dispersion compensation ratio and the variable dispersion compensation ratio, the range of the variable dispersion compensation of the variable dispersion compensator 4e is reduced. Also, even in a case in which the variable dispersion compensator 4e does not have a function for compensating for a dispersion slope, the dispersion compensation fiber 4d thus combined compensates for the dispersion slope.

Next, description will be made regarding the dispersion compensation ratio determined by the network management system 5. With the dispersion compensation ratio as $\beta$, and with the amount of chromatic dispersion in the optical transmission path as D [ps/nm], the dispersion compensation amount is represented by $-\beta D$ [ps/nm]. When the dispersion compensation ratio is set to 100%, the residual dispersion is zero ($D-\beta D=0$). That is to say, the dispersion compensation ratio $\beta$ represents the ratio with respect to the dispersion compensation amount at which the residual chromatic dispersion is zero after transmission via the optical transmission path.

As described above, in a case in which the dispersion compensation ratio $\beta$ is set to an optimum value for a particular kind of optical signal included in the WDM signals including optical signals having different bit rates or modulated using different modulation formats (which will be referred to as "type" hereafter) in a mixed manner, such a dispersion compensation ratio $\beta$ can be an unsuitable value for other types of the optical signals. Accordingly, in order to set the dispersion compensation ratio $\beta$ to an optimum value for all the types of optical signals handled in a mixed manner, the dispersion compensation ratio $\beta$ is selected such that the product of the transmission distance and the transmission capacity of the optical transmission path for the WDM signals to be transmitted exhibits the maximum value.

With respect to a single dispersion compensation ratio $\beta$, there is a difference in the distance via which the optical signal can be transmitted among the different types of optical signals included in the WDM signals. For example, in a case in which there are two types of optical signals, the transmittable distance can be represented by a function of $\beta$, e.g., $f(\beta)$ and $g(\beta)$. The functions $f(\beta)$ and $g(\beta)$ are determined according to the transmission power (dBm/ch) per channel to be input to the transmission path, the channel interval (Hz) of the WDM signals, and the kind of the transmission path fiber.

Furthermore, let us represent the number of wavelengths (the number of channels) provided by one of the two types of optical signals included in the WDM signals as w1, and the number of wavelengths provided by the other type as w2. Moreover, with the bit rates (b/s) provided by these optical signals as v1 and v2, the transmission capacities thereof are represented by (w1×v1) and (w2×v2), respectively.

Using the aforementioned $f(\beta)$, $g(\beta)$, w1, w2, v1, and v2, the product $S(\beta)$ of the transmission distance and the transmission capacity of the optical transmission path is represented by the following Expression.

$$S(\beta)=f(\beta)\times w1\times v1+g(\beta)\times w2\times v2 \quad \text{[Expression 1]}$$

In this case, in a case in which the number of the types of the optical signals to be multiplexed is increased, the number of the terms to be added in the right side of the Expression 1 may be increased.

Using the product $S(\beta)$ of the transmission distance and the transmission capacity as an index which indicates the overall performance of the system, the dispersion compensation ratio $\beta$ is set such that $S(\beta)$ exhibits the maximum value for the WDM signals to be transmitted. These values, i.e., $\beta$, $S(\beta)$, $f(\beta)$, $g(\beta)$, w1, w2, v1, and v2 can be stored in the database 6 in the form of a map. With such an arrangement, the network management system 5 reads out values according to the WDM signals to be transmitted, and determines the dispersion compensation ratio $\beta$ such that $S(\beta)$ exhibits the maximum value.

Also, an arrangement may be made in which the dispersion compensation ratio $\beta$ is set such that the product $S(\beta)$ of the transmission distance and the transmission capacity of the optical transmission path for the WDM signals exhibit the maximum value in a range, e.g., in a range greater than a lower limit which satisfies the spec of the transmission distance or the transmission capacity required with respect to one or more optical signals (or all optical signals) multiplexed in the form of WDM signals to be transmitted. That is to say, an arrangement may be made in which the dispersion compensation ratio $\beta$ is set such that $S(\beta)$ exhibits the maximum value within a range that satisfies predetermined specs requested by the system.

Specific description will be made regarding an optical transmission system via which 10-Gb/s optical signals and 40-Gb/s optical signals are transmitted in a mixed manner in the form of WDM signals as described above as an example. FIG. 4 through FIG. 7 illustrate an example with a transmission power of −4 dBm/ch, with a channel interval of 50 GHz, and with a total of 80 channels.

Figure 4:
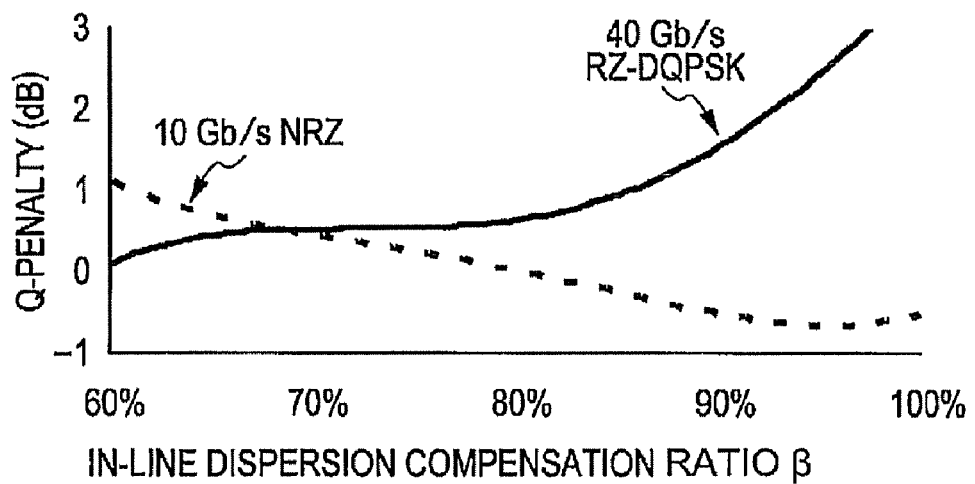
FIG. 4 is a first example of a graph which illustrates the relation between the dispersion compensation ratio and the penalty.

FIG. 4 is a graph which illustrates the relation between the dispersion compensation ratio β and the Q-penalty in this example. As illustrated in the graph, the 10-Gb/s optical signal and the 40-Gb/s optical signal have opposing properties. Accordingly, for example, in a case in which the dispersion compensation ratio β is set to the optimum value for the 10-Gb/s optical signal for the in-line repeater 4, the dispersion compensation ratio β can lead to deterioration of the 40-Gb/s optical signal. In order to solve such a problem, the dispersion compensation ratio β is changed according to the mixture ratio of the 40-Gb/s optical signal so as to maintain the overall performance of the system at a high level.

The value of the Q-penalty (dB) with respect to the dispersion compensation ratio β can be converted into the transmission distance. Based upon this fact, for example, assuming that the 10-Gb/s optical signal and the 40-Gb/s optical signal can be transmitted over the distance of 1,000 km and 500 km, respectively, with a Q-penalty of 0 dB, the transmission distance f(β) [km] for the 10-Gb/s optical signal and the transmission distance g(β) [km] for the 40-Gb/s optical signal are obtained with respect to the dispersion compensation ratio β. On the other hand, with the total number of the channels of the WDM signals as λ (fixed value), and with the number of the channels of the 40-Gb/s optical signal handled in a mixed manner as n (variable), the number of the channels of the 10-Gb/s optical signal is represented by (λ−n). Using these values, S(β, n) can be calculated (Expression 2) based upon the aforementioned Expression 1.

$$S(\beta,n)=10\times(\lambda-n)\times f(\beta)+40\times n\times g(\beta) \quad \text{[Expression 2]}$$

Figure 5:
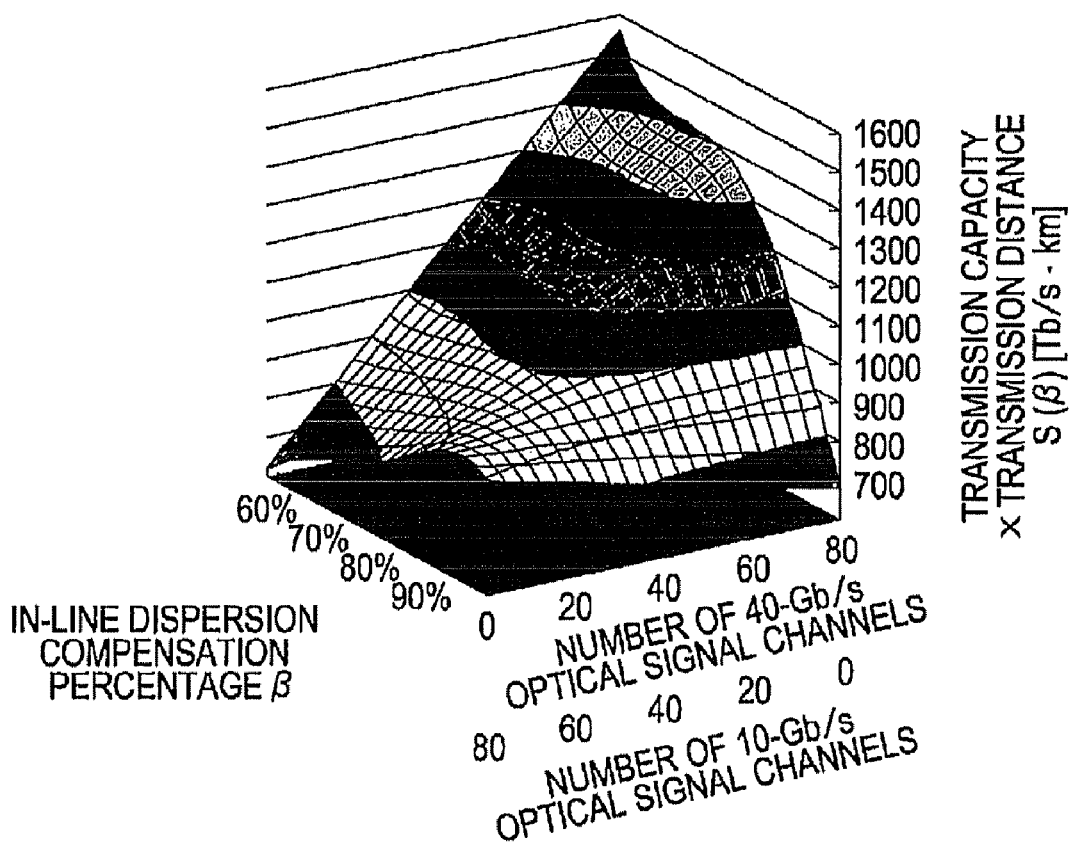
FIG. 5 is a first example of a graph which illustrates the relation between the dispersion compensation ratio, the channel mixture ratio, and $S(\beta)$.

FIG. 5 is a graph which illustrates S(β, n) at a dispersion compensation ratio β of 60% to 100% with regard to the channel mixture ratio of the WDM signals. Furthermore, FIG. 6A-6C illustrate graphs obtained by slicing the graph illustrated in FIG. 5 at (10-Gb/s optical signal:40-Gb/s optical signal)=(60 channels:20 channels), (10-Gb/s optical signal:40-Gb/s optical signal)=(40 channels:40 channels), and (10-Gb/s optical signal:40-Gb/s optical signal)=(20 channels:60 channels).

In FIGS. 6A-6C, the graphs f(β) and g(β), which are indicated by the right-side vertical axis (indicated by the arrow) and each of which indicates the maximum transmission distance, are obtained by converting the Q-penalty illustrated in FIG. 4 as described above. On the other hand, the graph S(β), which is indicated by the left-side vertical axis (indicated by the arrow) and which indicates the (transmission capacity× transmission distance), is obtained by slicing the graph illustrated in FIG. 5. FIG. 6A illustrates graphs at (10-Gb/s optical signal:40-Gb/s optical signal)=(60 channels:20 channels). FIG. 6B illustrates graphs at (10-Gb/s optical signal:40-Gb/s optical signal)=(40 channels:40 channels). FIG. 6C illustrates graphs at (10-Gb/s optical signal:40-Gb/s optical signal)=(20 channels:60 channels). In each drawing, the upper part illustrates a graph for 10-Gb/s optical signal, and the lower part illustrates a graph for 40-Gb/s optical signal.

Figure 7:
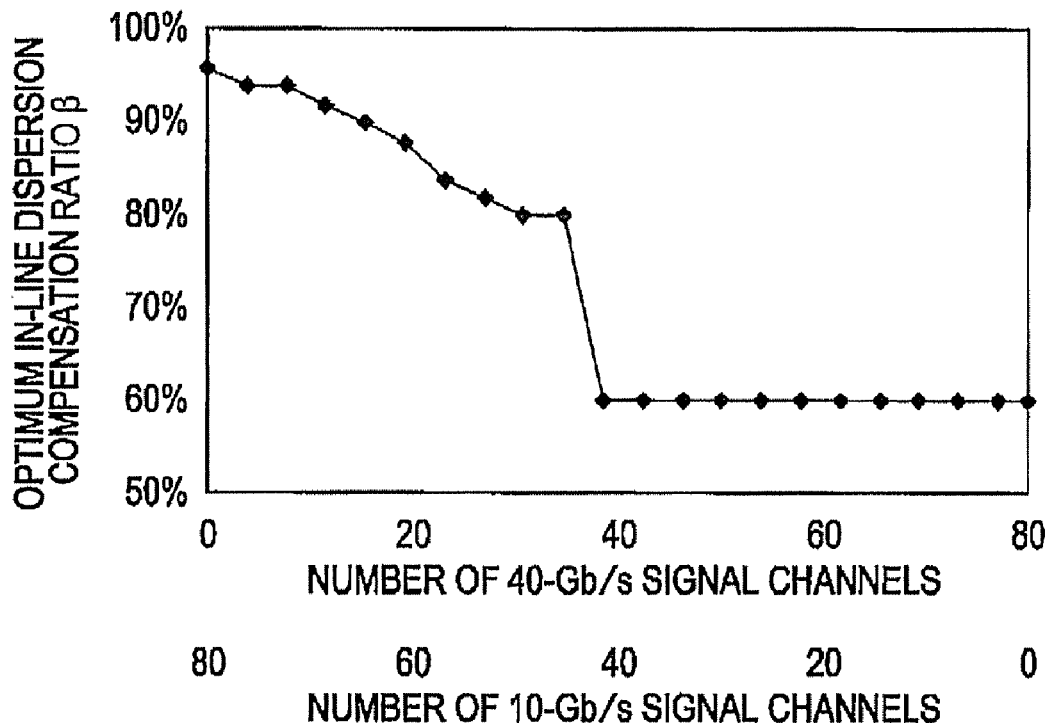
FIG. 7 is a first example of a graph which illustrates the relation between the channel mixture ratio and the dispersion compensation ratio at which S(β) exhibits the maximum value.
Figure 8:
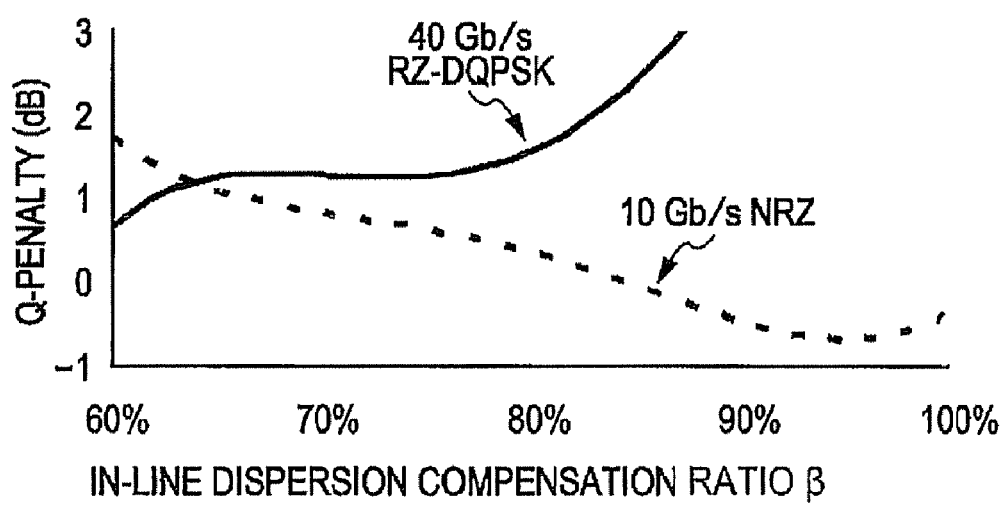
FIG. 8 is a second example of a graph which illustrates the relation between the dispersion compensation ratio and the penalty.
Figure 9:
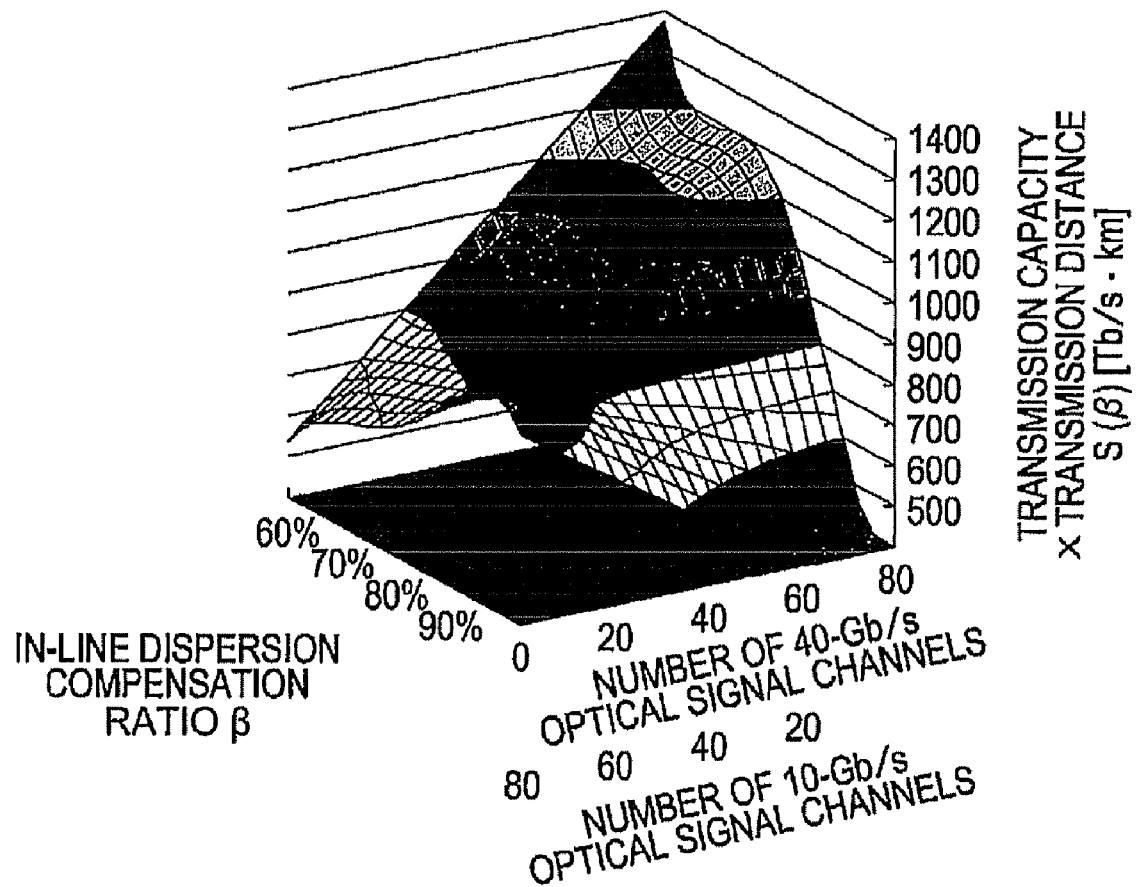
FIG. 9 is a second example of a graph which illustrates the relation between the dispersion compensation ratio, the channel mixture ratio, and S(β).
Figure 11:
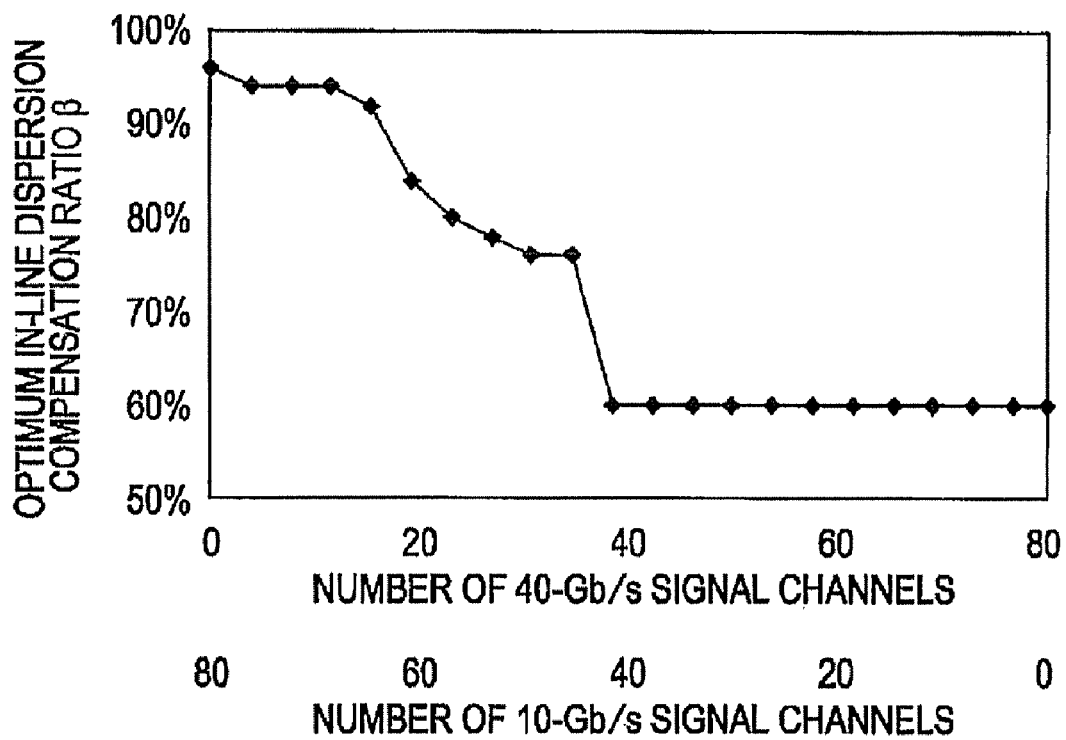
FIG. 11 is a second example of a graph which illustrates the relation between the channel mixture ratio and the dispersion compensation ratio at which S(β) exhibits the maximum value.
Figure 12:
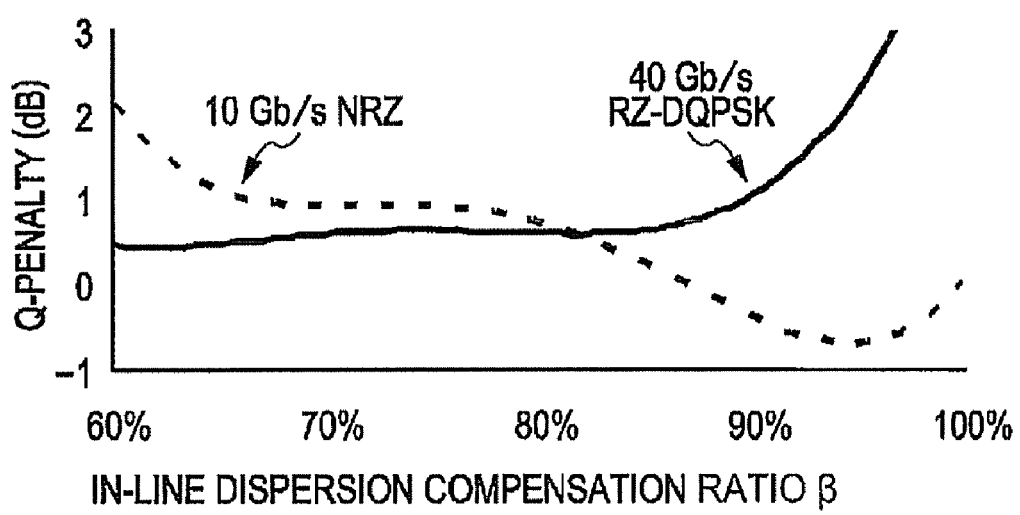
FIG. 12 is a third example of a graph which illustrates the relation between the dispersion compensation ratio and the penalty.
Figure 13:
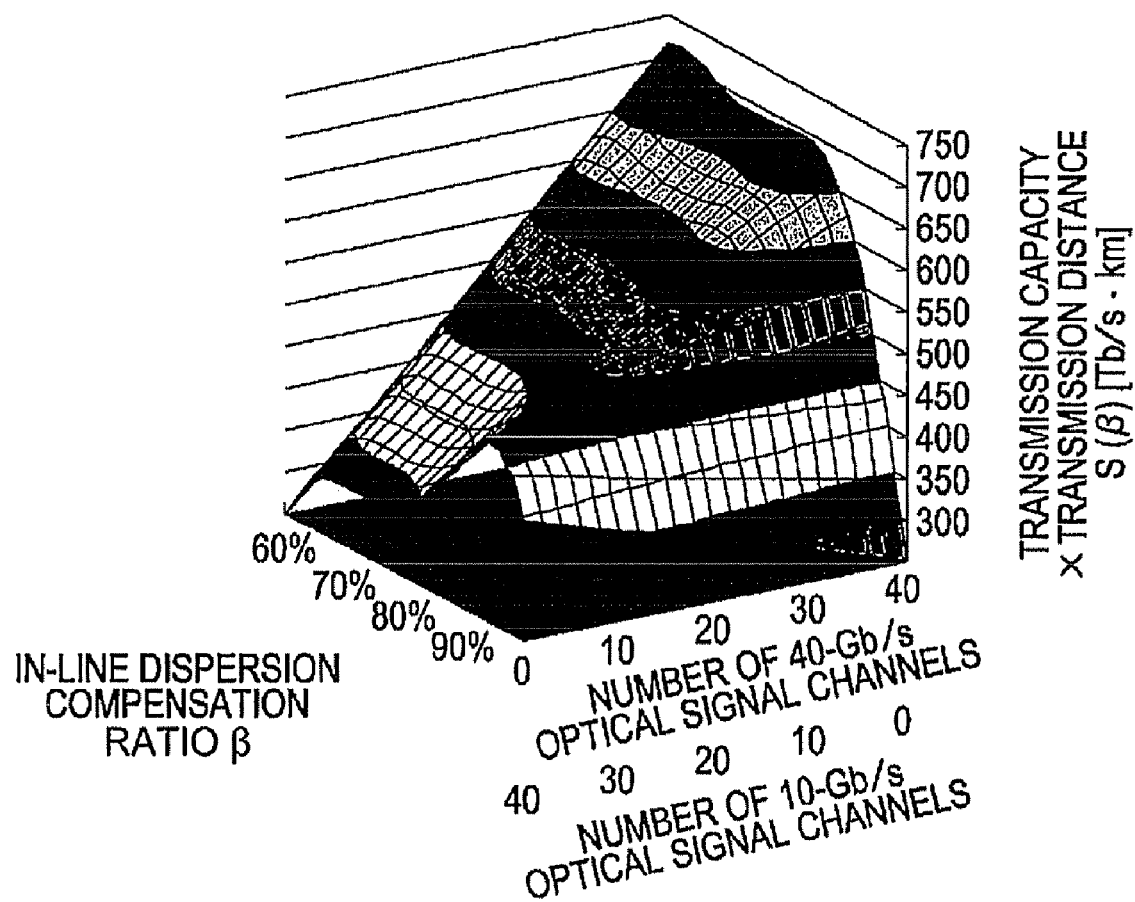
FIG. 13 is a third example of a graph which illustrates the relation between the dispersion compensation ratio, the channel mixture ratio, and S(β).

FIG. 7 is a graph obtained by plotting the dispersion compensation ratio β such that S(β) exhibits the maximum value at each channel mixture ratio of the WDM signals (multiplexing ratio of the optical signal) based upon the relation indicated by the graphs. It can be understood from this graph that, in a case in which the 40-Gb/s optical signal is not handled in a mixed manner, for example, S(β) exhibits the maximum value at a dispersion compensation ratio β around 95% which is the optimum value for the 10-Gb/s optical signal. Furthermore, it can be understood that the dispersion compensation ratio β at which the S(β) exhibits the maximum value is reduced according to an increase in the number of the wavelengths of the 40-Gb/s optical signals to be handled in a mixed manner.

That is to say, in a case in which the state of the WDM signals have changed, e.g., in a case in which the 40-Gb/s optical signals have been employed anew in a mixed manner in the optical transmission system illustrated in FIG. 1, or in a case in which the 40-Gb/s optical signals have been added or dropped in the ROADM optical transmission system illustrated in FIG. 2, the dispersion compensation ratio β at which the product S(β) of the transmission capacity and the transmission distance exhibits the maximum value, i.e., the dispersion compensation ratio β at which the system provides the best performance, changes. Accordingly, the network management system 5 dynamically changes the dispersion compensation ratio β to the maximum value according to the change in the state of the WDM signals with reference to the database 6 that stores the information including the aforementioned relation, and sets the optimum value thus obtained for the in-line repeater 4. Thus, such an arrangement maintains the overall performance of the system at a high level.

In addition, for example, the 10-Gb/s optical signals are transmitted 1,000 km transmission distance or more in the optical transmission system. In this case in which the channel mixture ratio of the WDM signals are (10-Gb/s optical signal: 40-Gb/s optical signal)=(20 channels:60 channels) illustrated in FIG. 6C, the dispersion compensation ratio β at which S(β) exhibits the maximum value is 60%. However, this state does not satisfy the specs to the effect that the transmission distance of the 10-Gb/s optical signals are equal to or greater than 1,000 km. Accordingly, in such a case, the dispersion compensation ratio β at which the S(β) exhibits the maximum value is determined in a range of f(β)≧1,000 km. Using this technique, in this case illustrated in FIG. 6C, the dispersion compensation ratio β=80% is selected.

In the embodiments illustrates regarding an arrangement in which the specs for one or more optical signals with respect to the transmission distance. Also, the same processing can be performed for an arrangement in which the specs are requested with respect to the transmission capacity.

FIG. 8 through FIG. 11 illustrate an example with a transmission power of 1 dBm/ch, with a channel interval of 50 GHz, and with a total of 80 channels. FIG. 12 through FIG. 15 illustrate an example with a transmission power of −1 dBm/ch, with a channel interval of 100 GHz, and with a total of 80 channels. Also, with such arrangements, the dispersion compensation ratio β can be obtained in the same way as with the above-described example.

Furthermore, the following additions will be disclosed with respect to the above-described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmission system comprising:
   an optical transmission path to transmit WDM signals to which optical signals of different wavelengths are multiplexed, the WDM signals including optical signals of different bit rates or optical signals of different modulation formats;
a repeater arranged in the optical transmission path, the repeater including a chromatic dispersion compensation unit to compensate chromatic dispersion for the WDM signals; and
a network management system including processes of:
determining a dispersion compensation ratio indicating a ratio with respect to a dispersion compensation amount at which residual dispersion of the WDM signals is zero after transmission via the optical transmission path, based on a mixture ratio of different optical signals included in the WDM signals, and
variably setting the dispersion compensation amount for an in-line repeater according to the dispersion compensation ratio,
wherein the network management system variably sets the dispersion compensation ratio in order to be a maximum value of a product of a transmission capacity of the transmission path and a transmission distance of the transmission line, wherein the maximum value is determined on the basis of a range to satisfy a spec of the transmission distance or the transmission capacity for one or more optical signals multiplexed in the WDM signals to be transmitted.

2. The optical transmission system of claim 1, wherein the network management system variably sets the dispersion compensation ratio in order to be a maximum value of a product of the transmission capacity of the transmission path and the transmission distance of the transmission line with respect to the WDM signals.

3. The optical transmission system of claim 1, wherein the network management system has a database storing the dispersion compensation ratio for the repeater, wherein the network management system reads out the dispersion compensation ratio from the database and sets the dispersion compensation amount for the repeater.

4. The optical transmission system of claim 1, wherein the network management system has a database storing the dispersion compensation ratio in order to be a maximum value of a product of the transmission capacity of the transmission path and the transmission distance of the transmission line in association with an optical signal mixture ratio of the WDM signals.

5. The optical transmission system of claim 1, further comprising a Reconfigurable Optical Add/Drop Multiplexer in the optical transmission path.

6. A method for chromatic dispersion compensation for an optical transmission path for transmitting WDM signals to which optical signals of different wavelengths are multiplexed, the WDM signals including optical signals of different bit rates or optical signals of different modulation formats, the method for chromatic dispersion compensation comprising:
determining a dispersion compensation ratio indicating a ratio with respect to a dispersion compensation amount at which residual dispersion of the WDM signals is zero after transmission via the optical transmission path, based on a mixture ratio of different optical signals included in the WDM signals; and
variably setting the dispersion compensation amount according to the dispersion compensation ratio
wherein the dispersion compensation ratio is set in order to be a maximum value of a product of a transmission capacity of the transmission path and a transmission distance of the transmission line, wherein the maximum value is determined on the basis of a range to satisfy a spec of the transmission distance or the transmission capacity for one or more optical signals multiplexed in the WDM signals to be transmitted.

7. The method for chromatic dispersion compensation of claim 6, wherein the dispersion compensation ratio is set in order to be a maximum value of a product of the transmission capacity of the transmission path and the transmission distance of the transmission line with respect to the WDM signals.

8. The method for chromatic dispersion compensation of claim 7 wherein:
the WDM signals include two optical signals of different wavelengths, numbers of the different wavelengths being defined as w1,w2, respectively;
the dispersion compensation ratio is defined as $\beta$;
the transmission distance of the transmission line for each of the optical signals as a function of $\beta$ is defined as $f(\beta),g(\beta)$, respectively;
the different bit rates are defined as v1,v2, respectively; and
the product of the transmission capacity of the transmission path and the transmission distance of the transmission line is defined as $S(\beta)$, the product being calculated from the equation:

$S(\beta)=f(\beta)\times w1\times v1+g(\beta)\times w2\times v2.$

* * * * *

UNITED STATES PATENT AND TRADEMARK OFFICE
CERTIFICATE OF CORRECTION

| | | |
|---|---|---|
| PATENT NO. | : 8,265,485 B2 | Page 1 of 1 |
| APPLICATION NO. | : 12/405582 | |
| DATED | : September 11, 2012 | |
| INVENTOR(S) | : Kentaro Nakamura et al. | |

It is certified that error appears in the above-identified patent and that said Letters Patent is hereby corrected as shown below:

On the title page, item [75]: (Inventors), Line 1, Delete "Kantaro Nakamura," and insert
-- Kentaro Nakamura, --, therefor.

Signed and Sealed this
Eighteenth Day of December, 2012

David J. Kappos
*Director of the United States Patent and Trademark Office*